No. 785,231. PATENTED MAR. 21, 1905.
W. ROBERTS & G. S. COXE.
COMPOSITION FOR POLISHING AND ABRADING TOOLS.
APPLICATION FILED FEB. 27, 1904.

WITNESSES:
INVENTORS.
Weldon Roberts and
George S. Coxe. by
Fischer and Sanders
ATTORNEYS.

No. 785,231. Patented March 21, 1905.

UNITED STATES PATENT OFFICE.

WELDON ROBERTS, OF GLENRIDGE, AND GEORGE S. COXE, OF NEWARK, NEW JERSEY, ASSIGNORS TO C. ROBERTS RUBBER COMPANY, A CORPORATION OF NEW JERSEY.

COMPOSITION FOR POLISHING AND ABRADING TOOLS.

SPECIFICATION forming part of Letters Patent No. 785,231, dated March 21, 1905.

Application filed February 27, 1904. Serial No. 195,535.

*To all whom it may concern:*

Be it known that we, WELDON ROBERTS, residing at Glenridge, and GEORGE S. COXE, residing in the city of Newark, county of Essex, State of New Jersey, have invented a new and useful Composition for Polishing and Abrading Tools, of which the following is a full, clear, and exact description, reference being had to the accompanying drawings, forming a part of this specification, in which—

Figure 1:
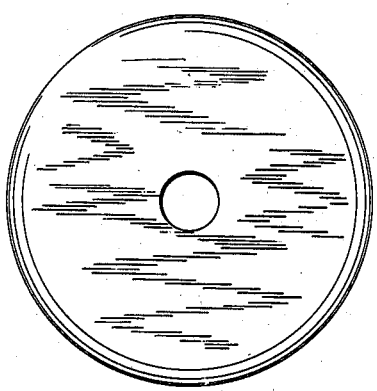
Figure 2:
Figure 3:
Figure 4:
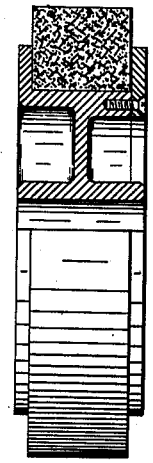
Figure 5:
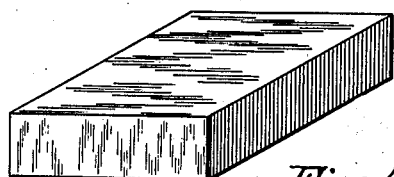

Figure 1 is a side view of a polishing or abrading wheel made of such composition. Fig. 2 is an end view of the same. Fig. 3 is a sectional view of a different form of wheel. Fig. 4 is a view, partly in section and partly in elevation, of still another modification of our invention; and Fig. 5 is a perspective view of a block of the composition used for hand polishing or abrading.

This invention has for its object the production of a new composition for polishing wheels and tools of various shapes and forms, a few of which we have illustrated, said invention being fully set forth in the following detailed description.

In the preparation of our composition we use a suitable quantity of pure rubber, to which, after it has been reduced to a plastic condition, we add a suitable quantity of sulfur, polishing or abrading material, coloring and burnishing material, hair, and, if desired, a quantity of lime. The latter we find under some circumstances to give better results in hastening and improving the vulcanizing of the composition. After "working" the ingredients thoroughly together until the mass is smooth and homogeneous, the whole is molded, cut, or otherwise reduced to the desired shape, according to the kind or class of tool to be made of the composition, after which these "shapes" or tools are suitably vulcanized.

The rubber which we use is what is known to the trade as "Para" rubber and is of the highest and best quality. Other grades of rubber can be used, but are not as suitable on account of the impurities they contain. As an abrading element we use emery of various grades, running from the very coarsest to the very finest, according to the purpose for which the tool is intended. We may use corundum or carborundum, pulverized glass, sand, flint, or pumice, according to the kind and quality of work for which the tool is intended—*i. e.*, grinding or polishing or relieving—and the substitution of any one of these elements for emery or any equivalent of any one of them we would consider as coming within the scope of our invention.

The hair in our composition we have found to perform a twofold function and is therefore to be considered a very important feature of our invention. First, it serves as a binder for holding the mass intact while in operation, and thus overcomes the liability of the bursting of a wheel made of our composition. This we find to be an important thing, for the reason that the abrading and polishing material tend to render the composition less cohesive, and therefore liable to burst from centrifugal action when rotating at very high speed. Second, we find that the exposed portions or ends of hair have a burnishing effect upon metals capable of receiving a high finish.

As a coloring-matter we may use either rouge or antimony, or in some cases we may use both for the purpose of getting various shades of color. We find it advantageous to use rouge in the finer grades of the composition not only as a coloring-matter, but as a polishing or burnishing agent. Paris-white or zinc oxid or even zinc sulfite may be used as a coloring-matter, if desired, and we find that each one of the last-mentioned materials possesses the additional advantage of giving "body" to the composition and also burnishing qualities. Aside from any inherent quality which any one of the coloring-matters above named may possess, excepting the burnishing quality, as described above, the principal purpose of their use is to produce an easy method of distinguishing the various grades of our composition when wrought into its various shapes.

We find in the making of the various grades of our composition it is desirable to hasten the process of vulcanization for the coarse grades and to retard it for the finer grades, and to do this we add during the process of mixing a varying quantity of lime, more for the coarser grades and less for the finer grades, omitting it entirely for the very finest grades, and in some cases we may omit it altogether even in the coarser grades. The lime when used serves as a hardening agent, and the more that is used the harder (and within certain limits) the more dense the composition becomes.

The proportions of the several ingredients which give the best results we have found after a long series of experiments to be as follows: Constant ingredient: Para rubber, eight pounds. Variable ingredients: sulfur, one-fourth to one pound; hair, one and one-half to three pounds; emery, seventy-six to eighty-two pounds, according to grade; lime, none to one and one-fourth pounds, according to grade. As substitutes for emery for various grades of composition to suit various purposes: sand, fifty to eighty-five pounds; ground glass, fifty to eighty-five pounds; corundum, seventy-five to eighty-five pounds; carborundum, seventy-five to eighty-five pounds; flint, fifty to eighty-five pounds; pumice, thirty-five to seventy-five pounds. Alternative coloring, burnishing, or body-makng materials: rouge, one to four pounds; antimony, one to four pounds; paris-white, two to six pounds; zinc oxid, two to six pounds; zinc sulfite, two to six pounds.

We are aware that it has been proposed to make an abrading or polishing composition of hard rubber and emery; but the resultant is a hard and unyielding substance. Our composition is distinguished from such composition in that it is more or less yielding and flexible, even to the extent that it may be termed a "soft-rubber" composition.

Having thus described our invention, what we claim, and desire to secure by Letters Patent of the United States, is—

1. A composition for polishing or abrading or relieving tools, composed of rubber, sulfur, hair, and an abrading or polishing substance.

2. A composition for polishing or abrading or relieving tools, consisting of a mass of vulcanized rubber having hair and a polishing or abrading material incorporated in such mass.

3. A composition for polishing or abrading and relieving tools, consisting of a mass of rubber to which is added and thoroughly incorporated therein, sulfur, hair, coloring material, a hardening material, and a quantity of abrading or polishing material.

4. A composition for polishing or abrading and relieving tools consisting of a mass of rubber to which is added and thoroughly incorporated therein, sulfur, hair, coloring material, a hardening material, a body-making or burnishing material, and a quantity of abrading or polishing material.

5. A polishing or abrading tool having as its constituent elements a mass of soft vulcanized rubber having incorporated within such mass a quantity of polishing or abrading and burnishing material, hair and coloring-matter.

6. A polishing or abrading tool, having as its constituent elements a mass of soft vulcanizing rubber having incorporated within such mass a quantity of polishing or abrading material, hair, coloring-matter, and a hardening material.

7. A polishing or abrading tool having as its constituent elements a mass of soft, vulcanizing rubber, having incorporated within such mass a quantity of emery, hair, rouge, and zinc sulfite.

8. A polishing or abrading tool having as its constituent elements rubber, sulfur, lime, emery, hair, rouge, and zinc sulfite.

This specification signed and witnessed this 24th day of February, 1904.

WELDON ROBERTS.
GEORGE S. COXE.

Witnesses:
FREDK. C. FISCHER,
GUY J. EDWARDS.